United States Patent

[11] 3,626,163

[72] Inventor Daniel O. Dommasch
 Blawenburg, N.J.
[21] Appl. No. 6,637
[22] Filed Jan. 28, 1970
[45] Patented Dec. 7, 1971
[73] Assignee The United States of America as
 represented by the Secretary of the Army
 and/or the Administrator of the Federal
 Aviation Administration

[54] AUTOMATIC LANDING SYSTEM
 6 Claims, 2 Drawing Figs.
[52] U.S. Cl. .................................................. 235/150.22,
 73/178 T, 235/61 NV, 244/76 R, 244/77 A,
 318/583, 318/591, 343/108 R
[51] Int. Cl. .................................................. B64c 19/00
[50] Field of Search .......................................... 73/178 R,
 178 T; 235/61 NV, 150.22; 244/76, 77 A, 81;
 318/583, 591; 343/108 R

[56] References Cited
UNITED STATES PATENTS
3,345,017 10/1967 Olah .............................. 343/108 X

*Primary Examiner*—Malcolm A. Morrison
*Assistant Examiner*—R. Stephen Dildine, Jr.
*Attorneys*—Charles K. Wright, Jr., William G. Gapcynski and Lawrence A. Neureither

ABSTRACT: A simple and inexpensive multimode automatic landing system comprising altitude hold means, glide slope control means, and flare control means. Air data sensing means are utilized in all systems, and the systems use common logic circuitry. Control of altitude is through the throttle and speed control is obtained by operation of the aircraft longitudinal control surfaces. The automatic landing system is designed to operate in parallel with the pilot so that it can be manually overriden at any time; however, when the controls are left free, the system will land the aircraft independently of the pilot.

INVENTOR
DANIEL O. DOMMASCH
BY Charles K Wright Jr.
ATTORNEY 3,626,163

AUTOMATIC LANDING SYSTEM

BACKGROUND OF THE INVENTION

1. Field of the Invention

This invention relates to a multimode automatic landing system for aircraft which employs air data sensing devices rather than gyroscopes and a common nonproportional, predictive, adaptive control logic.

2. Description of the Prior Art

Automatic landing systems of an experimental nature are now in operation which are applicable to large transport-type aircraft and which involve more or less extensive fixed or portable ground equipment installations. Achievement of reliability and fail safe operation is based on the use of multiple-redundant systems which increase cost, weight, and complexity well beyond what is considered reasonable for general aviation equipment.

SUMMARY OF THE INVENTION

This invention is an automatic landing system for aircraft which comprises an altitude hold mode for maintaining proper altitude prior to entering the glide slope path; a glide slope mode for controlling the rate of descent of the aircraft so that it remains on the proper glide path; and a flare mode which controls the height and speed of the aircraft until touchdown is achieved according to a preset program when the aircraft reaches a desired height above the runway. Auxiliary to the main components of the landing system are a velocity control system and a lateral stability control system. All of the control systems derive their sensory information from air data sensors as opposed to inertia type sensors, and each control system employs nonproportional, adaptive, predictive error logic. The altitude of the aircraft is controlled by means of the throttle, and the speed of the aircraft is controlled by the longitudinal control surfaces of the aircraft. All cross coupling of the control systems is obtained through the dynamics of the aircraft.

Accordingly, it is an object of this invention to provide a low-cost, reliable, automatic landing system which is applicable to general aviation aircraft.

DESCRIPTION OF THE PREFERRED EMBODIMENT

An automatic landing system must be capable of maintaining the aircraft at a desired altitude during the first leg of its landing approach pattern; it must control the descent of the aircraft to keep it on the proper glide path; it must maintain a safe approach speed; and it must initiate a flare maneuver to bring the aircraft out of its glide slope approach into a horizontal attitude and reduce its rate of descent and its speed to the desired touchdown conditions. This invention performs these functions and is suitable for use on general aviation aircraft.

The invention comprises three subsystems: an altitude hold system, a glide slope control system, and a flare control system. The invention is connected to the aircraft throttle through suitable servo means and to the aircraft longitudinal control elements through a speed stabilization system such as the parallel speed stabilization system described in my copending application, Ser. No. 6,635 filed Jan. 28, 1970.

Since the three subsystems operate successively, a common logic system can be used, thus simplifying the overall system and lowering its cost. All airborne control logic systems involve the use of feedback concepts. This term means only that the output signal generated by the logic is based on an error signal which is the difference between the desired value of a controlled quantity and the existing value of that quantity. This error signal is fed back to the logic system which acts to reduce or null the error by operating control elements in a manner which opposes the error.

A logic system which produces an actuation proportional to the error signal is said to use proportional logic. Proportional logic systems, which are widely used and simple to construct, have the drawback of tending toward oscillatory instability at high gain values. They also induce overshoot at even moderate gains unless they are highly damped.

Predictive or lead-type logic, also known as error and error rate logic, features considerably improved high-gain operation and total elimination of error at moderate gain. In this type of logic both the error and its rate of change are detected, and the probable error at some future time, $\Delta t$, is predicted. This predicted error is then used to form the basis for the control signal. The command generated by the logic system is related to the error pattern by the relation Command = $\Delta \delta$ = Gain $(e+\dot{e}\Delta t)$ where $e$ = error.

Each of the three subsystems—altitude hold, glide slope control, and flare control—uses this basic logic control, and each system is connected to the aircraft in parallel with the pilot. Thus, the system will operate the aircraft independently if the controls are left free; however, its actuating elements are provided with means to allow manual override by the pilot at any time. In this manner the system provides a unique safety feature in that the pilot and the control systems are mutually redundant.

Figure 1:
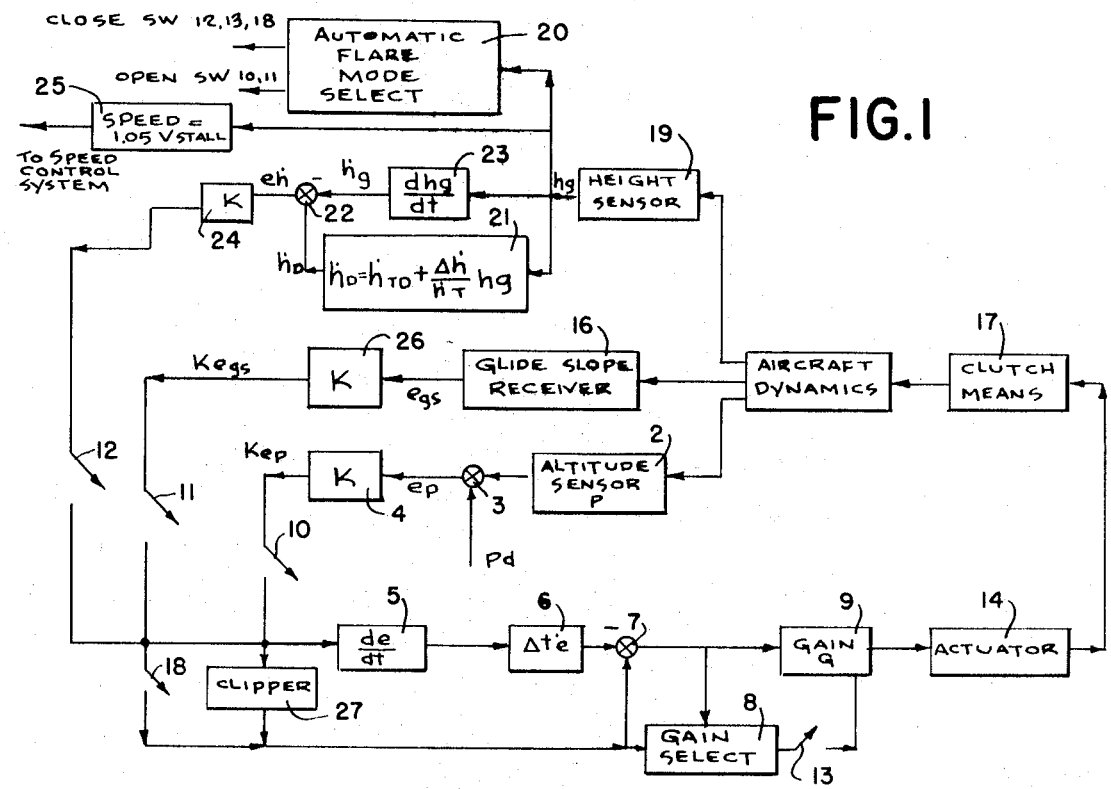
FIG. 1 is a functional block diagram of the automatic landing system.

Referring to FIG. 1 a functional block diagram of a particular embodiment of the automatic landing system is shown. The elements are illustrated in functional form, and it should be understood that any conventional electrical, hydraulic, or mechanical logic devices or actuating element can be used to perform the indicated operations. The system shown provides the proper inputs from the individual transducers to the logic system, and the logic system solves the equation $$\delta = G(e+\dot{e}\Delta t)$$

and provides a displacement command to the actuator control system.

Figure 2:
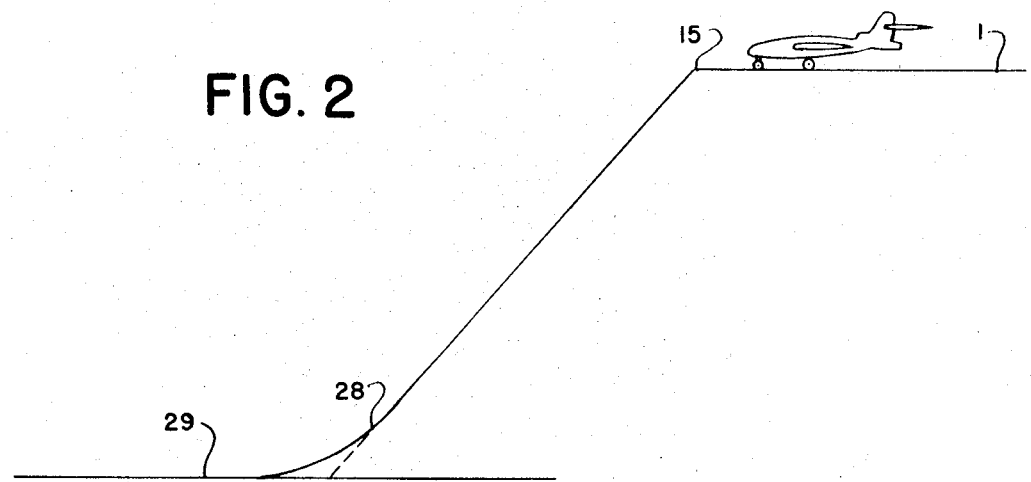
FIG. 2 is a view of an aircraft and its landing pattern.

Referring to FIGS. 1 and 2 the operation of the complete automatic landing system will be explained in terms of the function of each of the three subsystems. The desired mode of operation of the landing system is selected by closing or opening the appropriate switches of the group of switches 10, 11, 12, 13, and 18. The selection of the mode of operation may be made directly by means of a multiple gang switch on the control panel or indirectly by use of solenoid switches.

In normal operation the altitude hold system will be engaged first by closing switch 10 and opening switches 11, 12, 13, and 18. The function of the altitude hold system is to maintain the aircraft at a desired altitude, for example, as when the aircraft is on the first leg 1 of its landing pattern. A desired altitude is selected by the pilot, and a signal indicative of the actual altitude of the aircraft is generated by a static pressure transducer 2. These two signals are compared at summing node 3, and the error signal, $e_\mu$, consisting of the difference between the actual altitude signal and the desired altitude signal, is amplified by the amplifier 4 to properly match the level of the error signal to the control logic input. This sensed error signal from 4 is then differentiated by unit 5 to obtain the rate of change of the altitude. The predicted change in the altitude, $K\dot{e}_\mu\Delta t$, is formed by unit 6 which could be an amplifier whose gain is equal to the magnitude of $\Delta t$ or other multiplying means well known to those skilled in the art. The error signal $Ke_\mu$ is clipped by unit 27 to prevent sudden altitude command changes from causing limit cycle control action. This clipped error signal, $(Ke_\mu)_{cl}$, is combined with the predicted altitude change, $K\dot{e}_\mu\Delta t$, to form the predicted error, $[(Ke_\mu)_{cl}+K\dot{e}_\mu\Delta t]$ at summing node 7. This predicted error is amplified by amplifier 9 so that the output displacement command applied to the actuator system 14 is Command = $\delta = G[(Ke_\mu)_{cl}+K\dot{e}_\mu\Delta t]$.

In accord with common practice the actuator is separately stabilized by its own servo loops so that it can properly implement the commands given to it. The displacement actuator system drives the aircraft throttle to change the altitude in this embodiment, and it is intended that the speed stabilization system used in conjunction with the landing system control the speed through operation of the aircraft longitudinal control surfaces. The actuator system drives the throttle through clutch means 17 so that the system may be manually overridden by the pilot.

When the aircraft is in proper position 15 to begin its descent to the runway, the mode switch is set to the glide path control position, thus opening switches 10 and 12 and closing switches 11, 18, and 13. The glide path control system is used to drive the aircraft throttle to vary the altitude of the aircraft in response to an error signal which describes the error as compared to a desired glide path. The speed of the aircraft is held constant during the glide path approach at a preselected speed by an auxiliary speed control system.

The aircraft glide slope receiver is used to provide an indication of whether the aircraft is above or below the center of the airport glide slope beam on an angular basis. That is, it inherently measures the difference between the angle of the radius vector to the aircraft and the radius vector defined by the center of the glide slope beam. The only direct information provided by the glide slope receiver is that if the glide slope error signal is above neutral the aircraft must increase its height at the point of reading and vice versa. However, if the pilot simply tries to increase height, he will induce a coupled oscillation between himself and the glide slope error signal since by the time he has achieved a change in height he has also moved closer to the runway and the desired height has accordingly been reduced. The pilot must therefore interpret the glide slope signal in terms of rate of change of height with the recognition that if the aircraft is below the path he must simply reduce the rate of descent rather than ascend so that the glide slope may be smoothly intercepted. This requires that the rate of change of the error signal as well as its magnitude must be monitored, and both quantities must be used as the basis for control action.

Since a given glide angle error close into the runway corresponds to a smaller change in height and therefore to a smaller change in rate of altitude change that when the aircraft is at the outer limit of the glide slope path, the sensitivity of the glide slope error signal increases as the runway is approached. This represents an essential nonlinearity between error signal response and error response, and thus adaptation of response on the part of the pilot or an automatic landing system is required as the aircraft approaches the runway. Even with an adaptive system, the extreme sensitivity of the glide slope system at low altitudes normally precludes use of the glide slope signals below an altitude of perhaps 60 feet. This restriction coupled with the requirement for adaptation as altitude decreases requires some method of automatic cutoff or gain switching to prevent terminal unstable oscillations.

In the glide slope mode, the system functions in a manner similar to that described for the altitude hold mode. In the glide slope mode switches 11, 18 and 13 are closed and switches 12 and 10 are open so that the glide slope error signal $e_{gs}$, from the glide slope receiver 16 is applied to the logic system after suitable amplification by unit 26 to meet system matching requirements. The error signal, $e_{gs}$, is computed by unit 6. This is subtracted at node 7 to form the predicted error and is amplified by amplifier 9 to form the displacement actuator command,
Command $= \delta = G[e_{gs} - \dot{e}_{gs}\Delta t]$.
This command then drives the actuator system through overridden means 17 so that the system can be manually overridden by the pilot. The gain of amplifier 9 is controlled by unit 8 which senses the predicted error from node 7 and the error signal, $e_{gs}$; the ratio of these quantities is then utilized to control the switching of the gain of amplifier 9 as previously discussed. Clipping of the error signal is not employed as large step changes introduced by the pilot do not occur in this mode.

The third mode of the system, the automatic flare mode, is responsible for pulling the aircraft out of the glide path and reducing its rate of change of altitude and speed at a predetermined rate to the values desired at touchdown. To bring the aircraft from its glide path rate of descent to the desired touchdown rate of descent, a program for calculating the desired rate of descent at any given instant in the flare pattern must be written. Although an exponential relationship between the rate of change of height and the height is theoretically more nearly correct, a linear program is satisfactory and is much simpler to implement. The program for generating the desired rate of change of altitude signal, $\dot{h}_D$, is as follows:

$$\dot{h}_D = \dot{h}_{TD} + \frac{\Delta \dot{h}}{h_T} h_g = \dot{h}_{TD} + \frac{\dot{h}_i - \dot{h}_{TD}}{h_T} h_g$$

where:
$\dot{h}_D$ is the desired rate of change of altitude at any given instant;
$\dot{h}_{TD}$ is the desired rate of change of altitude at touchdown;
$h_T$ is the total change in the rate of change of altitude from beginning of flare to touchdown;
$\dot{h}_i$ is the rate of change of altitude at any point in the flare maneuver; and
$h_g$ is the instantaneous altitude of the aircraft.

The error signal to the throttle to change the altitude is obtained by comparing the preprogrammed desired rate of change of altitude, $\dot{h}_D$, with the measured rate of change of altitude $\dot{h}_g$. An ultrasonic radar was utilized to measure the height in this embodiment, but other accurate height measuring systems may be used. The flare system is designed to cut in automatically when the height above the runway is a predetermined value, in this embodiment, 60 feet.

The speed of the aircraft must also be reduced from its value during the glide path approach to the desired touchdown speed. Although a gradual reduction of speed may be used, a step decrease in the speed at the start of the flare maneuver to the desired touchdown speed has been found to be satisfactory. For this embodiment a desired touchdown speed of 1.05 times the stall speed was used. The speed change is designed to be automatically implemented at the start of the flare maneuver. In this system since the altitude is controlled by the throttle, it is necessary that a speed control system operating through the aircraft longitudinal control surfaces, such as that disclosed in my copending application Ser. No. 6,635, filed Jan. 28, 1970, be used.

In operation, the height sensor 19, which in this embodiment is an ultrasonic radar, provides a signal $h_g$ indicative of the instantaneous height of the aircraft. This signal is used to trigger the automatic mode select circuit 20 when the aircraft reaches a predetermined height 28, $h_g$, in this embodiment, 60 feet, above the runway 29. The automatic mode select circuit closes switches 12, 13, and 18 and opens switches 10 and 11. The height signal, $h_g$, is also applied to the preprogrammed desired height signal generating circuit 21. This circuit provides a signal indicative of the desired rate of change of height computed from the equation $$\dot{h}_D = \dot{h}_{TD} + \frac{\Delta \dot{h}}{h_T} h_g$$

The height signal, $h_g$, is differentiated by unit 23 to form the rate of change of height signal, and this signal is compared at node 22 to the desired rate of change of height signal to form the rate of change of height error signal. This signal, after amplification to meet system matching requirements by unit 24, forms the input to the logic circuitry. This input is operated by the logic circuitry in the same manner as in the other two modes to generate a throttle displacement control signal to change the altitude of the aircraft. The system reduces the height of the aircraft according to the preprogrammed desired height signal until touchdown is achieved.

The height signal, $h_g$, is also applied to unit 25 which generates a signal which forms the input to the speed control system. The speed control signal in this embodiment generates a step command to change the speed to 1.05 $V_{STALL}$, but any desired touchdown speed or a programmed gradual reduction in speed may also be used.

In operation, the pilot would set the mode switch to the altitude hold mode while in normal flight. When the landing pattern is begun the pilot sets the altitude control to the proper altitude and the speed control to the desired speed. As the runway is approached and the glide slope receiver captures the glide path beacon, the mode switch is set to the glide path mode, and the aircraft begins its descent. The speed should be set to the proper value before the glide path is entered as in this system the speed during the glide path remains constant. When the aircraft reaches a predetermined height from the ground, the system automatically switches into the flare mode. The flare maneuver is performed and the aircraft is landed. The aircraft should be equipped with a lateral stabilization system, such as the one described in my copending application, Ser. No. 6,636, filed Jan. 28, 1970, although this aspect of controlling the aircraft could be left to the pilot if desired.

I claim:

1. In an aircraft equipped with a throttle, a glide slope beam receiver and an automatic speed control system which controls the speed of said aircraft through operation of the longitudinal control surfaces of said aircraft, an automatic landing system comprising a common logic system, altitude mode control means comprising altitude hold mode sensor means which generates a first signal proportional to the altitude of said aircraft, altitude selection means which generates a second signal proportional to the desired altitude of said aircraft means to combine said first and second signals to produce an error signal to be applied to said logic system to produce an output displacement command in response to said error signal, said output displacement command being nonproportional to said error signal, actuating means responsive to said displacement command to effect a displacement of said throttle; a glide slope mode control means, said glide slope control means comprising said glide slope receiver which produces a third signal indicative of the angular displacement of the aircraft from the glide slope beam of the airport, said third signal comprising an error signal to be applied to said logic system to cause displacement of said throttle; flare mode control means comprising a height sensor which generates a fourth signal proportional to the height of said aircraft above the runway, means for differentiating said fourth signal, means for generating a fifth signal indicative of the desired rate of change of the height of said aircraft, the value of said fifth signal being preprogrammed to linearly reduce the rate of change of height of said aircraft until the desired rate of change of height at touchdown is achieved, means for combining said fourth and fifth signals to generate an error signal to form the input to said logic system to cause a displacement of said throttle, means for generating a sixth signal indicative of a desired touchdown speed of the aircraft, said sixth signal to be applied to the input of said aircraft speed control means; and mode selection means to connect each of said mode control means successively.

2. The system of claim 1 in which said logic system comprises means for differentiating said error signal input, means to form a signal proportional to the predicted controlled quantity change at a future time, means for producing predicted error signal by combining said error signal and said predicted controlled quantity change signal, amplifying means which amplifies said predicted error signal to form said output displacement command.

3. The system of claim 2 in which the gain of said amplifying means is responsive to changes in the relative magnitude of said error signal and said predicted error signal.

4. The system of claim 1 in which said actuating means are operatively connected to said throttle through clutch means to permit manual override of said automatic landing system.

5. The system of claim 1 in which said mode selection means comprises manually operated switch means to connect the error signal from said altitude hold mode sensor means to said logic system and to connect the error signal from said glide slope mode control means to said logic system when that mode of operation is desired; and switching means to automatically connect the error signal from said flare control height sensor to said logic means when said aircraft reaches a predetermined height.

6. In an aircraft equipped with a throttle, a glide slope beam receiver and an automatic speed control system which controls the speed of said aircraft through operation of the longitudinal control surfaces of said aircraft, an automatic landing system comprising a common logic system, altitude mode control means comprising altitude hold mode sensor means which generates a first signal proportional to the altitude of said aircraft, altitude selection means which generates a second signal proportional to the desired altitude of said aircraft, means to combine said first and second signals to produce an error signal, said common logic system comprising means for differentiating said error signal input to said logic system, means to form a signal proportional to the predicted controlled quantity change at a future time, means for producing a predicted controlled quantity change signal by combining said error signal and said predicted controlled quantity change signal, amplifying means which amplifies said predicted signal to form an output displacement command signal, the gain of said amplifier being controlled by changes in the relative magnitudes of said error signal and said predicted signal, actuating means responsive to said output displacement command signal to effect a displacement of said throttle, said actuating means operatively connected to said throttle through clutch means to permit manual override of said automatic landing system; a glide slope mode control means comprising said glide slope receiver which produces a third signal proportional to the angular displacement of the aircraft from the glide slope beam of the airport, said third signal comprising the error signal to be applied to said logic system to cause displacement of said throttle; a flare mode control means comprising a height sensor which generates a fourth signal proportional to the height of said aircraft above the runway, means for differentiating said fourth signal, means for generating a fifth signal proportional to the desired rate of change of the height of said aircraft above said runway, the value of said fifth signal being programmed to linearly reduce the rate of change of height until the desired rate of change of height at touchdown is achieved, means for combining said fourth and fifth signals to generate an error signal to be applied to said logic system to cause a displacement in the throttle, means for generating a sixth signal indicative of the desired speed of said aircraft at touchdown, said sixth signal to be applied automatically to the input of said aircraft speed control means when said aircraft reaches a predetermined height above the runway; and mode selection means comprising manually operated switch means to connect the error signal from said altitude hold mode sensor to said logic system and to connect the error signal from said glide slope control mode sensor means to said logic system when that mode of operation is desired, and switching means to automatically connect the error signal from said flare control mode means to said logic system when said aircraft reaches a predetermined height above the runway.

* * * * *